(12) United States Patent
Jain et al.

(10) Patent No.: US 11,907,807 B2
(45) Date of Patent: Feb. 20, 2024

(54) METHOD AND SYSTEM OF ENHANCED HYBRID QUANTUM-CLASSICAL COMPUTING MECHANISM FOR SOLVING OPTIMIZATION PROBLEMS

(71) Applicant: INFOSYS LIMITED, Bangalore (IN)

(72) Inventors: Vipul Jain, Kolkata (IN); Aditya Bothra, Laxmi Nagar (IN); Vijayaraghavan Varadharajan, Salem (IN); Umberto Borso, London (GB)

(73) Assignee: INFOSYS LIMITED, Bangalore (IN)

( * ) Notice: Subject to any disclaimer, the term of this patent is extended or adjusted under 35 U.S.C. 154(b) by 19 days.

(21) Appl. No.: 17/706,215

(22) Filed: Mar. 28, 2022

(65) Prior Publication Data
US 2023/0289643 A1 Sep. 14, 2023

(30) Foreign Application Priority Data
Mar. 9, 2022 (IN) .............................. 202241012733

(51) Int. Cl.
*G06N 10/40* (2022.01)
(52) U.S. Cl.
CPC .................... *G06N 10/40* (2022.01)

(58) Field of Classification Search
None
See application file for complete search history.

(56) References Cited

U.S. PATENT DOCUMENTS

2022/0216982 A1* 7/2022 McCarty ................. H04L 9/002

\* cited by examiner

*Primary Examiner* — Scott C Sun
(74) *Attorney, Agent, or Firm* — Troutman Pepper Hamilton Sanders LLP (Rochester)

(57) ABSTRACT

A method of enhanced hybrid quantum-classical computing mechanism for solving optimization problems is disclosed comprising altering a value of a configuration chromosome by storing an angle memory on a shared classical memory. The angle memory corresponds to a predefined configuration chromosome. The method then generates a state vector based on the angle memory and reinitializes a quantum circuit from the state vector. Subsequently, generating at least two most probable configuration chromosome from the reinitialized quantum circuit corresponding to a superposition of qubits in a position chromosome. Subsequently selecting one of the at least two most probable configuration chromosomes for each position chromosome after evaluation by a fitness function.

17 Claims, 6 Drawing Sheets

Quantum circuit created from state vector

FIG. 5

METHOD AND SYSTEM OF ENHANCED HYBRID QUANTUM-CLASSICAL COMPUTING MECHANISM FOR SOLVING OPTIMIZATION PROBLEMS

This application claims the benefit of Indian Patent Application No. 202241012733, filed Mar. 9, 2022, which is incorporated by reference in its entirety.

FIELD

The present disclosure relates to method, system, and computer program product of enhanced hybrid quantum-classical computing mechanism for solving optimization problems.

BACKGROUND

In quantum evolutionary algorithms evolution (or optimization) is the result of a rotation quantum gate, which introduces an interference phenomenon. Thus, individuals or chromosomes are adjusted or modified to be more similar to the best individual in the population. However, in simple genetic algorithm (SGA) once individuals are evaluated the algorithm simulating selection (e.g., wheel parents selection operator) will replace the old population P(t) with a new population P(t+1) of individuals. Since individuals are selected according to their fitness values we are evolving a population of solutions via Darwinian evolution but with a greater selection pressure than quantum genetic algorithm (QGA). Hence, SGA replaces obsolete strategies by innovative strategies represented by the offspring. Likewise, when crossover is included as a step-in hybrid genetic algorithm (HGA), its performance usually improves approaching to SGA. The aim is to solve an optimization problem on a digital computer, either to test a novel improvement or hardware technology in the QGA, or solve real-world problems using a novel class of algorithm instead of classical GA.

The hybrid classical QGA implementation can be applied to a variety of optimization problems. It could solve combinatorial problems like the Travelling Salesman problem or the Vehicle Routing Problem which have major application in the logistics sector. It can even be used in automotive manufacturing sector like most optimized placement of sensors so that the number of sensors used in the car can be reduced.

SUMMARY

Systems and methods disclosed herein relate to quantum information processing. The computational capability of a quantum computer is much more powerful than conventional digital computers. More specifically to related to enhanced hybrid quantum-classical computing mechanism for solving optimization problems. Access to quantum computing resources is expensive and availability of Quantum Ram (Q-RAM) is still years, if not decades away. Storing of states of chromosomes on a Q-RAM is not possible due to its unavailability and non-storage of states leads to non-optimal results.

An enhanced hybrid quantum-classical computing mechanism for solving optimization problems, is disclosed comprising at least one quantum processor unit (QPU) and a shared classical memory. The shared classical memory is connected to the at least one QPU. The QPU is configured to alter a value of a configuration chromosome by storing an angle memory on the shared classical memory wherein the angle memory corresponds to a predefined configuration chromosome. A state vector is generated based on the angle memory and reinitializing a quantum circuit from the state vector, the system generates at least two most probable configuration chromosome from the reinitialized quantum circuit corresponding to a superposition of qubits in a position chromosome. The system is configured to select one of the at least two most probable configuration chromosomes for each position chromosome after evaluation by a fitness function. The angle memory is configured to store a value of $\theta$ in classical memory for each qubit of each configuration chromosome. The amplitude of the qubits in the configuration chromosome is limited to a set of real values based on the value of $\theta$. The mapping of a chromosome to the qubits of quantum computer is performed through superposition of qubits corresponding to a combination of at least one configuration chromosome and at least one position chromosome. A set of chromosomes are selected based on an evaluation at each generation through a rotation operation to select the best chromosome to approximate the state of chromosomes to the state of the optimum chromosome comprising rotating a set of states of the qubit in the configuration chromosome towards the state of the qubit in the best configuration chromosome based on the modification of the stored value of $\theta$ in angle memory. A new population of chromosome is generated based on the state vector and the modified value of $\theta$. The two most probable configurations are selected from a set of random number of measured configuration chromosomes corresponding to each position chromosome, based upon a probability measure method for a second evaluation using the fitness function.

A method of enhanced hybrid quantum-classical computing mechanism for solving optimization problems is disclosed comprising altering a value of a configuration chromosome by storing an angle memory on a shared classical memory. The angle memory corresponds to a predefined configuration chromosome. The method then generates a state vector based on the angle memory and reinitializes a quantum circuit from the state vector. Subsequently, generating at least two most probable configuration chromosome from the reinitialized quantum circuit corresponding to a superposition of qubits in a position chromosome. Subsequently selecting one of the at least two most probable configuration chromosomes for each position chromosome after evaluation by a fitness function. The angle memory is configured to store a value of $\theta$ in classical memory for each qubit of each configuration chromosome and one amplitude of the qubits in the configuration chromosome is limited to a set of real values based on the value of $\theta$. A mapping of a chromosome to the qubits of quantum computer is performed through superposition of qubits corresponding to a combination of at least one configuration chromosome and at least one position chromosome. A set of chromosomes are then selected based on an evaluation at each generation. A rotation operation is performed to select the best chromosome to approximate the state of chromosomes to the state of the optimum chromosome comprising rotating a set of states of the qubit in the configuration chromosome towards the state of the qubit in the best configuration chromosome based on the modification of the stored value of $\theta$ in angle memory. A new population of chromosome is generated based on the state vector and the modified value of $\theta$. The two most probable configurations are selected from a set of random number of measured configuration chromosomes corresponding to each position chromosome, based upon a probability measure method for a second evaluation using the fitness function.

BRIEF DESCRIPTION OF DRAWINGS

The examples of this technology are illustrated by way of example and not limitation in the figures of the accompanying drawings, in which like references indicate similar elements and in which.

DETAILED DESCRIPTION

Examples of this technology may be implemented innumerous ways, including as a system, a process, an apparatus, or as computer program instructions included on a computer readable medium such as a computer readable storage medium or a computer network wherein program instructions are sent over optical or electronic communication links.

A detailed description of one or more examples is provided below along with accompanying figures. The detailed description is provided in connection with such examples but is not limited to any particular example. The scope is limited only by the claims and numerous alternatives, modifications, and equivalents are encompassed. Numerous specific details are set forth in the following description in order to provide a thorough understanding. These details are provided for the purpose of example and the described examples may be implemented according to the claims without some or all of these specific details. For the purpose of clarity, technical material that is known in the technical fields related to the examples has not been described in detail to avoid unnecessarily obscuring the description.

The examples described herein provide methods and systems for processing structured data and unstructured data. As will be explained in more detail below, in one example, unstructured data and structured data are captured and correlated to define links between the structured data and any associated unstructured data. The unstructured data and the structured data are stored in one or more data structures. As a result, both structured data and unstructured data are integrated into a data repository where such data may be collectively accessed.

Figure 1:
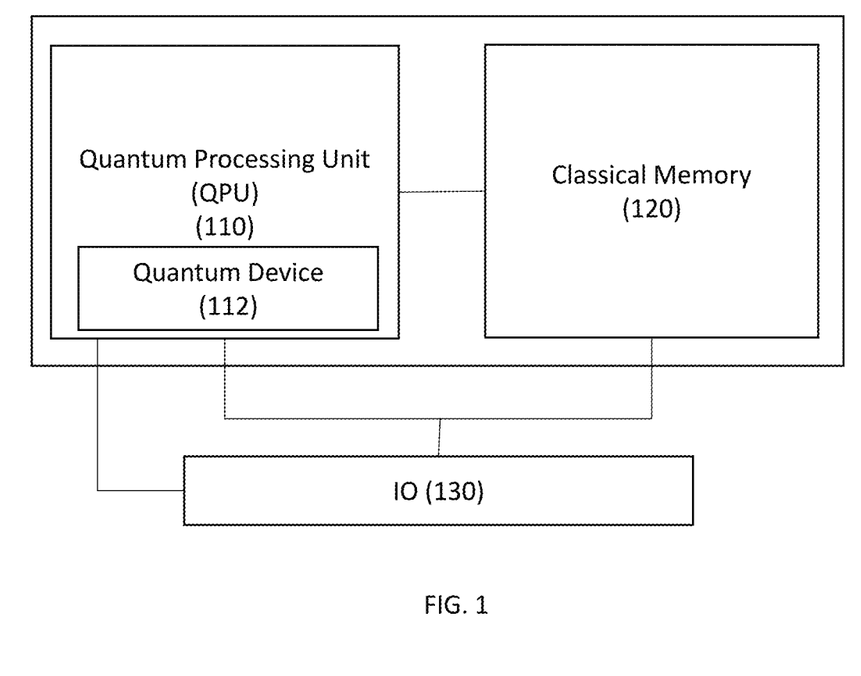
FIG. 1 depicts an example of a quantum computing device.

FIG. 1 is a block diagram depicting an example of a quantum computing device 100. For clarity, FIG. 1 is not to scale and portions of the quantum computing device 100 are not shown. The quantum computing device 100 includes a quantum processor 110, quantum computing device magnetic memory 120 and input/output (I/O) device 130. The quantum processor 110 includes quantum devices 112, of which only one is shown for simplicity. The quantum processor 110 is coupled with classical memory 120.

In one example, a Quantum Computer is a machine that performs computation exploiting quantum mechanical phenomena such as Entanglement, Superposition and Interference. The unit of information in a classical computer is the bit, which always has a completely well-defined state: it can either be 0 or 1 at any point during the computation. The unit of information in a Quantum Computer is the qubit and its state is described by a statevector $|q\rangle$. A qubit can be in state $$|0\rangle = \begin{pmatrix} 1 \\ 0 \end{pmatrix} \text{ or state } |1\rangle = \begin{pmatrix} 0 \\ 1 \end{pmatrix}$$

as well as any linear combination of these states (Superposition principle); $|q\rangle = \alpha|0\rangle + \beta|1\rangle$. The qubit is found in a completely well-defined state only when it is measured. The probability of measuring the qubit in state $|0\rangle$ is $|\alpha|^2$ and the probability of measuring state $|1\rangle$ is $|\beta|^2$.

Figure 2A:
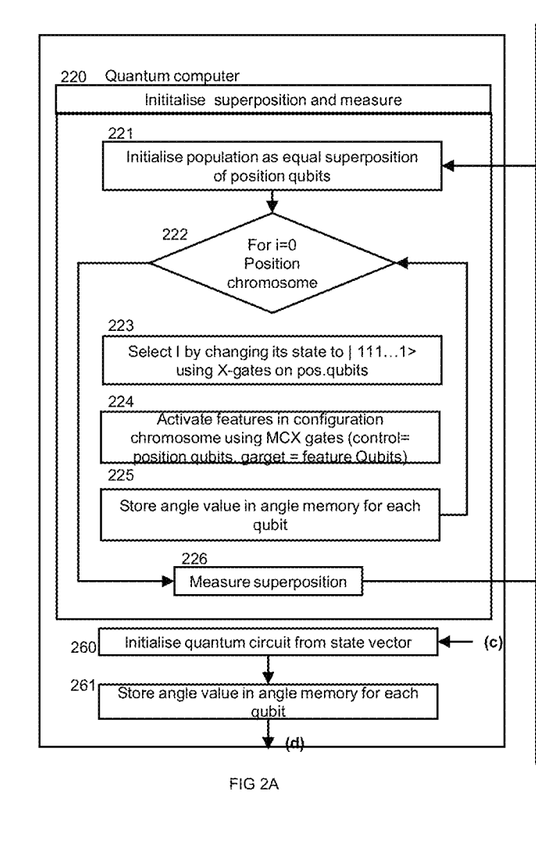
FIG. 2A, FIG. 2B and FIG. 2C are step-by-step demonstration of enhanced hybrid quantum-classical computing mechanism for solving optimization problems. The method of examples of this technology is explained through an example of describing an advertisement click through rate (CTR) Optimization.
Figure 2B:
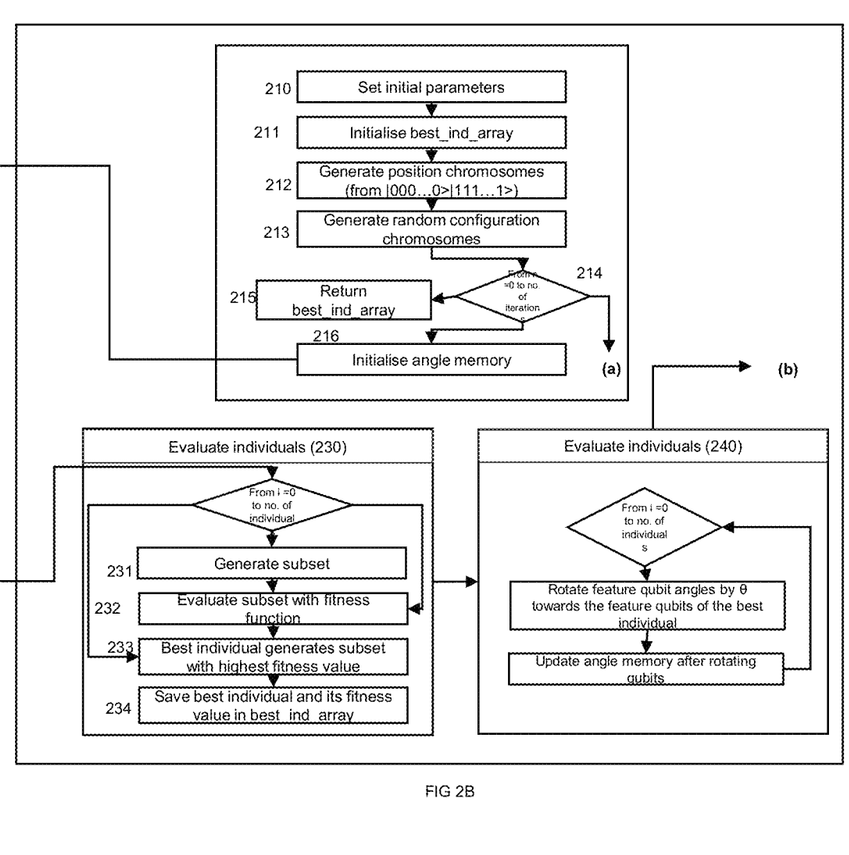
Figure 2C:
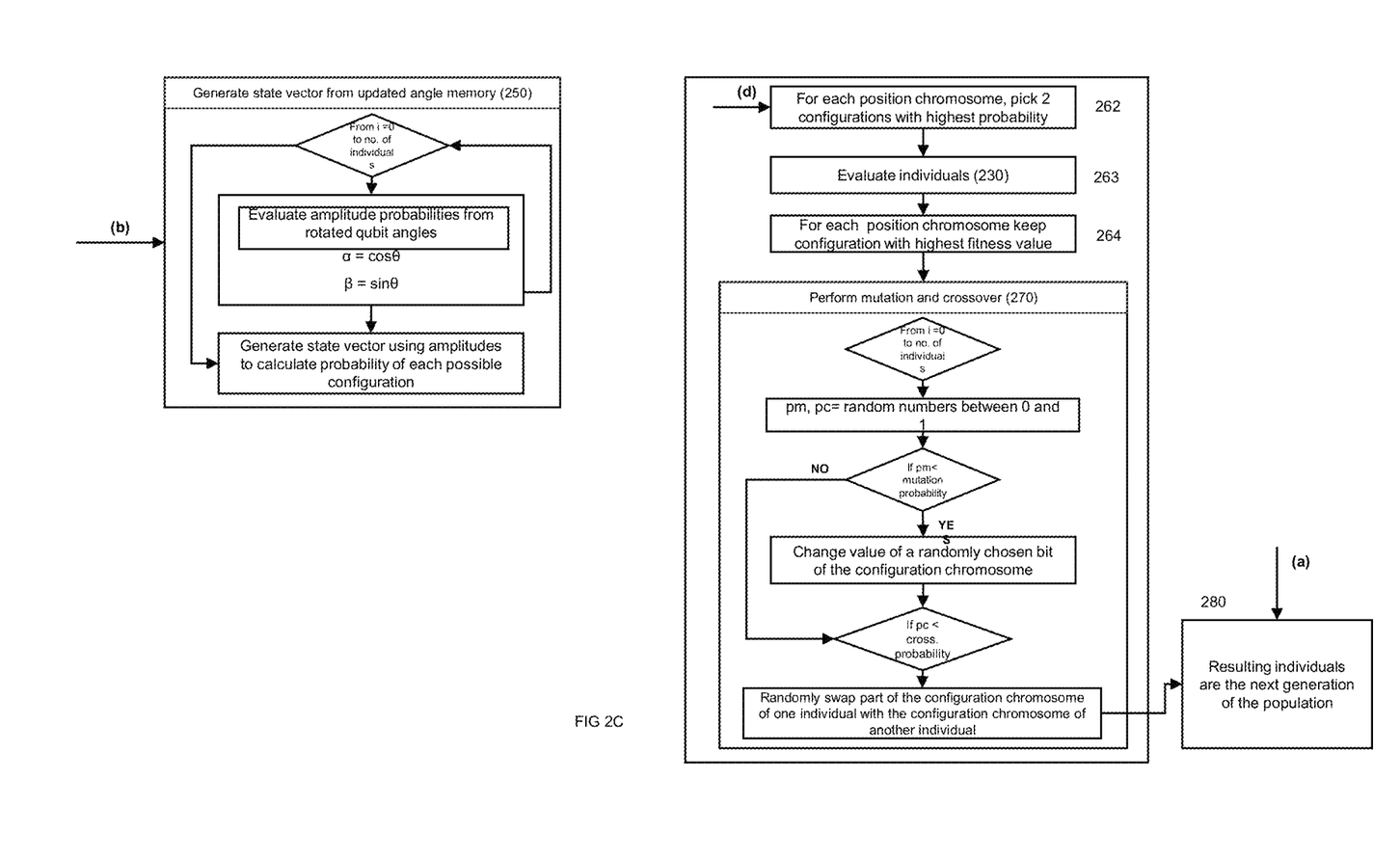

FIG. 2A, FIG. 2B and FIG. 2C is a step-by-step demonstration of enhanced hybrid quantum-classical computing mechanism for solving optimization problems. The method of examples of this technology is explained through an example of describing an advertisement click through rate (CTR) Optimization. The process reflects the mode of natural selection where the fittest individuals are selected for reproduction to produce offspring of the next generation. At the classical computer (290), the initialization of all the necessary parameters is performed (210), (211) for identification of the optimal target audience to maximize the CTR. The algorithm begins with an initial generation of position chromosomes (212) and generation of random population of chromosomes (213). Hence, the algorithm revolves around the population and evolves in search of optimal solutions Representing the real-world features of dataset in the form of configuration chromosome as defined above in the doc. To map the chromosome to the qubits of quantum computer we create superposition of qubits, which represents the combination of configuration and position chromosome (212). Evaluate each individual (214) at each iteration of a generation using the fitness function. The best individual (215) corresponds to the subset with the highest fitness value. The angle memory is initialized (216) for storing θ. A quantum computer (2A) consisting of n qubits can exist in a superposition of $2^n$ states (220): from $|000\ldots0\rangle$ to $|111\ldots1\rangle$ binary representation (221). Population is encoded as equal superposition of position chromosomes (H-gates). Each individual/chromosome is selected (223) by transforming its position chromosome to 1111. Selected features are encoded in predefined configuration chromosome using Multi Controlled X-gates (224).

Figure 3:
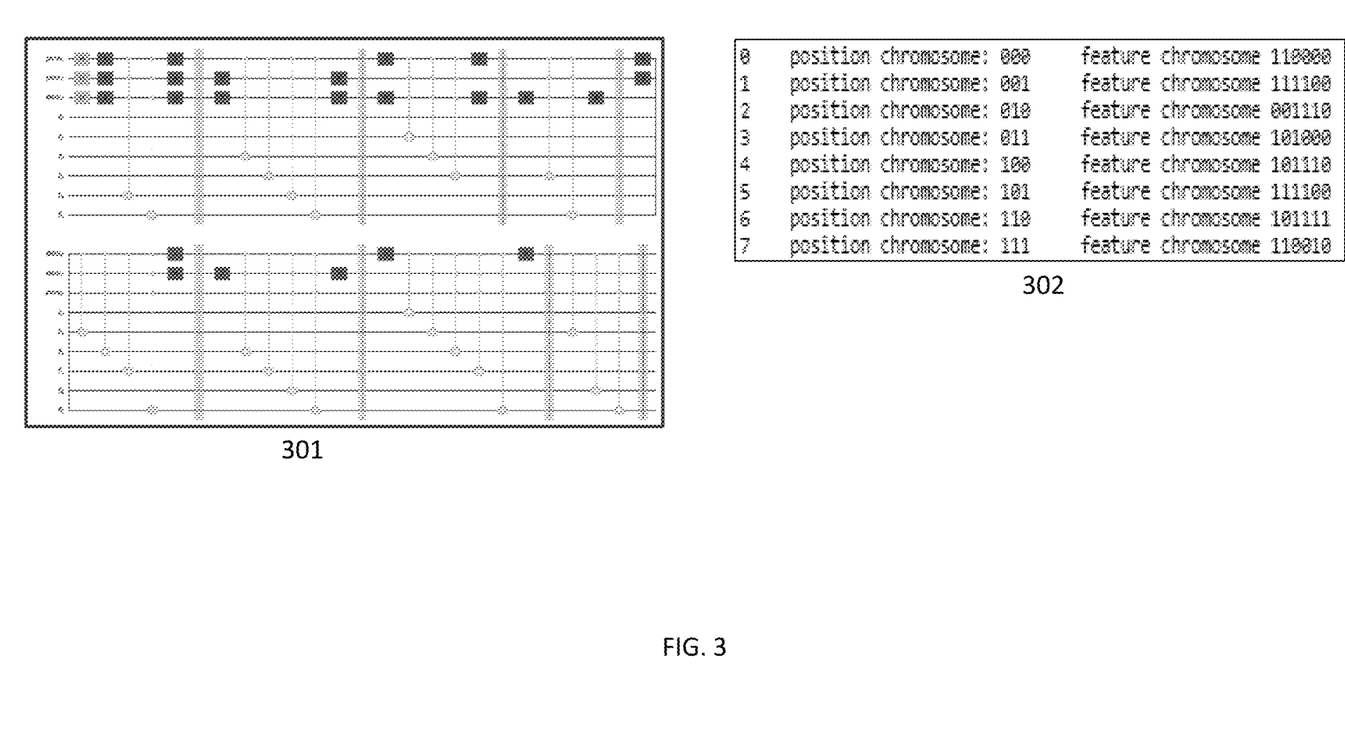
FIG. 3 represents selected features encoded in configuration chromosome using Multi Controlled X-gates (301) and the circuit represents these chromosomes (302).

In another example, (FIG. 3) represents selected features encoded in configuration chromosome using Multi Controlled X-gates (301) and the circuit represents these chromosomes (302).

In one example, Qubit state can be expressed as:

$|\Psi\rangle = \alpha|0\rangle + \beta|1\rangle$

Since $|\alpha|^2 + |\beta|^2 = 1$ represent, respectively, the probability that the qubit is found in state $|0\rangle$ or in state $|1\rangle$, we have that: $|\alpha|^2 + |\beta|^2 = 1$ Therefore if we consider α and β to be real numbers, then they can be expressed as:

$\alpha = \cos\theta$ $\beta = \sin\theta$

In another example, the amplitudes of the qubits in the configuration chromosome are limited to real values and represented as: α=cos θ, β=sin θ. The value of θ is stored classically (225) in angle_memory for each qubit of each configuration chromosome. As the present-day Quantum computer lacks the hardware support for Quantum Ram, the amplitudes cannot be stored in the quantum computer. The values of θ are stored in angle_memory in format similar to, but not limited to,

[[0, 0, 0, 0, 1.5707963267948966, 1.5707963267948966], [0, 0, 0.7853981633974483, 0.7853981633974483, 1.5707963267948966, 1.5707963267948966] . . . ]]

In another example, measuring initial superposition (226) gives equal probability of all individuals/chromosomes (example with 3 position qubits and 6 feature qubits). In total if there are p position qubits then $2^p$ different individuals are evaluated (230), which generates $2^p$ different subsets (231).

In one example, each individual/chromosome is evaluated (232) at each iteration of a generation using the fitness function. The best individual corresponds to the subset with the highest fitness value (233). The CTR value of each subset is evaluated using the ML prediction model. The best individual corresponds to the subset with the highest CTR value and is stored (234). 1st Evaluation is performed to identify best individual among the initial superposition. The whole population is still retained, and the best individual stays the same. Rotation of qubits is performed (240) to move the other individuals towards the best individual for each position chromosome.

Figure 4:
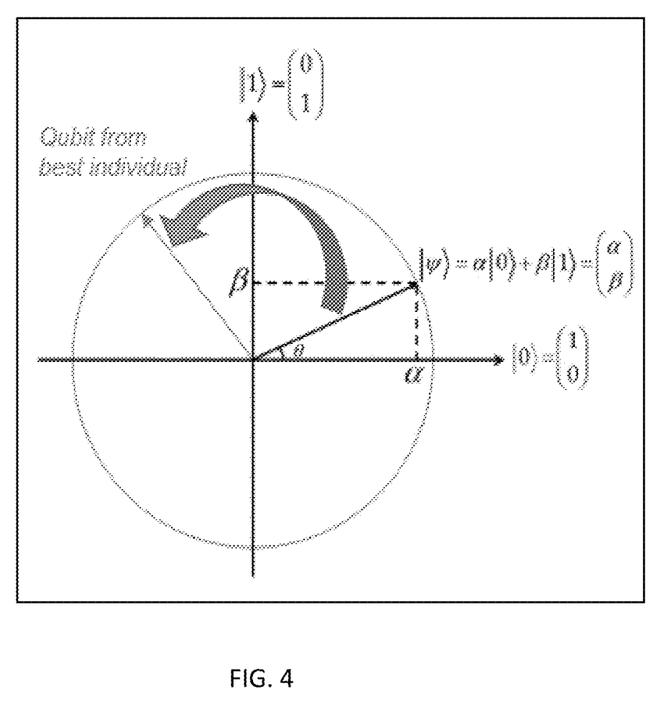
FIG. 4 indicates the best individuals selection as the parents and is used to guide the changes in the next generation of the population.

In one example, FIG. 4 indicates the best individuals are selected as the parents and is used to guide the changes in the next generation of the population. This is performed using rotation operators which approximate the state of chromosomes to the state of the optimum chromosome in the population. The states of a qubit in a configuration chromosome (feature chromosome) are rotated towards the state of a qubit in the best configuration chromosome, by modifying the stored value of θ in angle memory.

Figure 5:
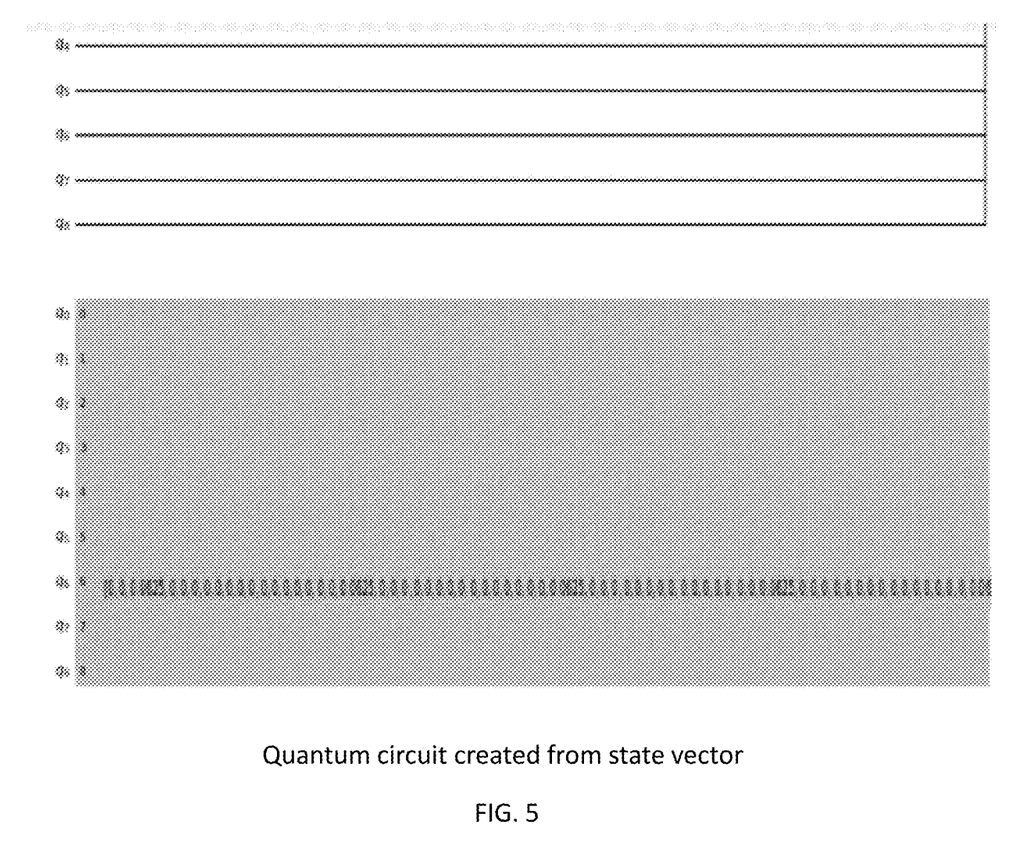
FIG. 5 indicates a quantum circuit initialized and created from the statevector.

In another example, a state vector is generated (250) from the modified θ values of angle memory and the quantum circuit is reinitialized from this state vector. State vector contents look like [0 0 1/16 0 0 0 0 0 0 0 0 0 0 0 0 0 . . . 0 1/16 0 0.08839 0 1/16 0 0 0 0 0 0 1/16 0].
A quantum circuit is initialized (260) and created from this statevector (FIG. 5). New population may be generated from statevector and may be represented as:

New Feature Chromosome: ['001110', '001110', '011111', '101100', '111010', '001111', '001111', '001111', '001011', '001000']

New Position Chromosome: ['000000', '000001', '000010', '000011', '000100', '000101', '000110', '000111', '001000', '001001']

The position chromosome in the new population is not altered and remains the same.

In another example, measuring (261) new superposition gives increasingly more individuals with different probabilities. Originally, only one configuration chromosome per each position chromosome was available, meaning that the configuration qubits only have one possible state. However, when the rotations happen, the amplitudes of the qubits, which represent their probability of being in state |0> or |1>, change. Therefore, when the qubits are measured, many possible configurations arise with different probabilities. Hence, "Probability based method" is used which gives the freedom to select any number of measured configuration chromosome for each position chromosome based upon probability measure for being evaluated (263) by the fitness function (2nd Evaluation).

In one example, 2 most probable configuration chromosome may be selected (262) for evaluation. In other instance or 3 or more may be selected for evaluation. If evaluation is performed for just 1 probable configuration chromosome, then a lot of diversity coming from the qubit rotations may be lost. On the other hand, evaluation of all possible configurations for each possible chromosome would take more time. However considering many different combinations of features, it is proposed that evaluating 2 most probable configurations gives a good balance between these two aspects. In order to achieve higher chance of finding the optimal configuration, this number may be increased, however this would also lead to a longer run time.

In another example, Evaluation of the two most probable individuals, generated via rotation of the states of qubit in chromosomes of the population, using the fitness function is performed. Only the one with the highest fitness value survives (264) to the next generation.

In another example, crossover and mutation (270) (both with p=0.2) of the configuration chromosomes is performed to introduce randomness/diversity in the population. By setting p=0.2 not all population will undergo crossover and mutation rather only 20% of them will undergo through changes. For instance consider there are 64 position chromosomes (6 position qubits used) at a particular generation and only the best one of the 2 most probable configuration chromosome is passed on to the next generation. So to sum it up, before the individuals were evaluated for 2nd evaluation there were 64×2=128 individuals and after the evaluation only 64 survivors are left. Hence, these 64 survivors will be eligible for crossover and mutation.

In one example these steps are repeated (290) until the algorithm converges to an optimal solution. By analyzing the specific feature constraints under which the subset was generated, it is possible to identify the optimal target audience to maximize the CTR of the advertising campaign.

Although the present examples have been described with reference to specific examples, it will be evident that various modifications and changes may be made to these examples without departing from the broader spirit and scope of the various examples. For example, the various devices and modules described herein may be enabled and operated using hardware circuitry, firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, or a portable memory device. A computer program embodying the aspects of the examples may be loaded onto the retail portal. The computer program is not limited to specific examples discussed above, and may, for example, be implemented in an operating system, an application program, a foreground or background process, a driver, a network stack or any combination thereof. The computer program may be executed on a single computer processor or multiple computer processors.

Moreover, as disclosed herein, the term "computer-readable medium" includes, but is not limited to portable or fixed storage devices, optical storage devices and various other mediums capable of storing or containing data.

Accordingly, the specification and drawings are to be regarded in an illustrative rather than a restrictive sense.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of examples of this technology may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various examples set forth herein are described in terms of exemplary block diagrams, flow charts and other illustrations. As will become apparent to one of ordinary skill in the art after reading this document, the illustrated examples and their various alternatives may be implemented without confinement to the illustrated examples. For example, block diagrams and their accompanying description should not be construed as mandating a particular architecture or configuration.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

We claim:

1. An enhanced hybrid quantum-classical computing mechanism for solving optimization problems, comprising;
    at least one quantum processor unit (QPU);
    a shared classical memory, the shared classical memory being connected to the at least one QPU;
    the QPU being configured to alter a value of a configuration chromosome by storing an angle memory on the shared classical memory,
        wherein the angle memory corresponds to a predefined configuration chromosome;
    generating a state vector based on the angle memory;
    reinitializing a quantum circuit from the state vector;
    generating at least two most probable configuration chromosome from the reinitialized quantum circuit corresponding to a superposition of qubits in a position chromosome;
    selecting one of the at least two most probable configuration chromosomes for each position chromosome after evaluation by a fitness function.

2. The system of claim 1, wherein the angle memory is configured to store a value of θ in classical memory for each qubit of each configuration chromosome.

3. The system of claim 1, wherein at least one amplitude of the qubits in the configuration chromosome is limited to a set of real values based on the value of θ.

4. The system of claim 1, wherein, a mapping of a chromosome to the qubits of quantum computer is performed through superposition of qubits corresponding to a combination of at least one configuration chromosome and at least one position chromosome.

5. The system of claim 1, wherein, a set of chromosomes are selected based on an evaluation at each generation.

6. The system of claim 1, wherein a rotation operation is performed to select the best chromosome to approximate the state of chromosomes to the state of the optimum chromosome comprising;
    rotating a set of states of the qubit in the configuration chromosome towards the state of the qubit in the best configuration chromosome based on the modification of the stored value of θ in angle memory.

7. The system of claim 1, wherein a new population of chromosome is generated based on the state vector and the modified value of θ.

8. The system of claim 1 wherein the two most probable configurations are selected from a set of random number of measured configuration chromosomes corresponding to each position chromosome, based upon a probability measure method for a second evaluation using the fitness function.

9. A method of enhanced hybrid quantum-classical computing mechanism for solving optimization problems, comprising;
    altering, through a quantum processor unit (QPU) alter a value of a configuration chromosome by storing an angle memory on a shared classical memory,
        wherein the angle memory corresponds to a predefined configuration chromosome;
    generating a state vector based on the angle memory;
    reinitializing a quantum circuit from the state vector;
    generating at least two most probable configuration chromosome from the reinitialized quantum circuit corresponding to a superposition of qubits in a position chromosome;
    selecting one of the at least two most probable configuration chromosomes for each position chromosome after evaluation by a fitness function.

10. The method of claim 9, wherein the angle memory is configured to store a value of θ in classical memory for each qubit of each configuration chromosome.

11. The method of claim 9, wherein at least one amplitude of the qubits in the configuration chromosome is limited to a set of real values based on the value of θ.

12. The method of claim 9, wherein, a mapping of a chromosome to the qubits of quantum computer is performed through superposition of qubits corresponding to a combination of at least one configuration chromosome and at least one position chromosome.

13. The method of claim 9, wherein, a set of chromosomes are selected based on an evaluation at each generation.

14. The method of claim 9, wherein a rotation operation is performed to select the best chromosome to approximate the state of chromosomes to the state of the optimum chromosome comprising;
    rotating a set of states of the qubit in the configuration chromosome towards the state of the qubit in the best configuration chromosome based on the modification of the stored value of θ in angle memory.

15. The method of claim 9, wherein a new population of chromosome is generated based on the state vector and the modified value of θ.

16. The method of claim 9, wherein the two most probable configurations are selected from a set of random number of measured configuration chromosomes corresponding to each position chromosome, based upon a probability measure method for a second evaluation using the fitness function.

17. A computer program product of enhanced hybrid quantum-classical computing mechanism for solving optimization problems, the computer program product comprising a computer readable storage medium having program instructions embodied therewith, the program instructions are executable by a processor to cause the processor to: alter, through a quantum processor unit (QPU) alter a value of a configuration chromosome by storing an angle memory on a shared classical memory,
    wherein the angle memory corresponds to a predefined configuration chromosome;
    generate a state vector based on the angle memory;
    reinitialize a quantum circuit from the state vector;
    generate at least two most probable configuration chromosome from the reinitialized quantum circuit corresponding to a superposition of qubits in a position chromosome;
    select one of the at least two most probable configuration chromosomes for each position chromosome after evaluation by a fitness function.

* * * * *